United States Patent
Ogawa

(10) Patent No.: US 9,763,207 B2
(45) Date of Patent: Sep. 12, 2017

(54) TIMING SYNCHRONIZATION DEVICE AND TIMING SYNCHRONIZATION CONTROL METHOD

(75) Inventor: Takatoshi Ogawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/119,820

(22) PCT Filed: May 10, 2012

(86) PCT No.: PCT/JP2012/061980
§ 371 (c)(1),
(2), (4) Date: Nov. 22, 2013

(87) PCT Pub. No.: WO2012/165115
PCT Pub. Date: Dec. 6, 2012

(65) Prior Publication Data
US 2014/0086234 A1    Mar. 27, 2014

(30) Foreign Application Priority Data
May 31, 2011  (JP) .................. 2011-121461

(51) Int. Cl.
*H04W 56/00*    (2009.01)
*H04J 3/06*    (2006.01)
*G01S 19/01*    (2010.01)

(52) U.S. Cl.
CPC ......... *H04W 56/0015* (2013.01); *G01S 19/01* (2013.01); *H04J 3/0638* (2013.01);
(Continued)

(58) Field of Classification Search
CPC ....... H04S 19/01; H04J 3/0638; H04J 3/0644; H04J 3/0641; H04J 3/0658; H04J 3/0647; H04W 56/0015
(Continued)

(56) References Cited

U.S. PATENT DOCUMENTS

2002/0027923 A1*  3/2002  Tokunaga ............. H04J 3/0632
                                                    370/401
2003/0048758 A1    3/2003  Jones et al.
(Continued)

FOREIGN PATENT DOCUMENTS

CN        1309486 A     8/2001
CN      101267251 A     9/2008
(Continued)

OTHER PUBLICATIONS

Chinese Office Action dated Jul. 31, 2015 in Chinese Application No. 201280025909.1 with an English translation thereof.
Russian Decision on Grant dated Mar. 12, 2015 with a partial English translation thereof.
Chinese Notice of Allowance in CN Application No. 201280025909.1, dated Sep. 28, 2016, and English Translation thereof.
(Continued)

*Primary Examiner* — Jae Y Lee
*Assistant Examiner* — Jean F Voltaire
(74) *Attorney, Agent, or Firm* — McGinn IP Law Group, PLLC.

(57) ABSTRACT

A first synchronization signal for synchronization with a synchronization signal source is acquired from a first signal source. A first signal synchronized with the synchronization signal source is generated based on the first synchronization signal. A second synchronization signal for synchronization with the synchronization signal source is acquired from a second signal source different from the first signal source. A second signal synchronized with the synchronization signal source is generated based on the second synchronization signal. A timing signal synchronized with the synchronization signal source is generated based on the first signal of a synchronization device. A phase difference between the timing signal and the second signal is output. An offset is set so that there is no phase difference between the timing signal and the second signal based on the phase difference.

9 Claims, 7 Drawing Sheets

(52) U.S. Cl.
CPC ........... *H04J 3/0644* (2013.01); *H04J 3/0641* (2013.01); *H04J 3/0647* (2013.01); *H04J 3/0658* (2013.01)

(58) Field of Classification Search
USPC ........................................................ 370/350
See application file for complete search history.

(56) References Cited

U.S. PATENT DOCUMENTS

| | | | |
|---|---|---|---|
| 2007/0297546 A1 | 12/2007 | Shen | |
| 2009/0238214 A1 | 9/2009 | Hong | |
| 2011/0047319 A1* | 2/2011 | Jeon | G06F 13/4243 711/103 |
| 2011/0207472 A1* | 8/2011 | Abraham | A47G 33/00 455/456.1 |
| 2013/0039369 A1* | 2/2013 | Forsberg | H04J 3/1664 370/510 |

FOREIGN PATENT DOCUMENTS

| | | |
|---|---|---|
| JP | 11-271476 A | 10/1999 |
| JP | 2000-269949 A | 9/2000 |
| JP | 2010-85325 A | 4/2010 |
| JP | 2010-273148 A | 12/2010 |
| RU | 2233545 C2 | 7/2004 |
| WO | WO 2008/103170 A1 | 8/2008 |

OTHER PUBLICATIONS

Extended European Search Report dated Jan. 8, 2016 in Application No. 15191308.4.
European Search Report dated Oct. 1, 2014, with English translation thereof.
International Search Report in PCT/JP2012/061980 dated Aug. 7, 2012 (English Translation Thereof).

\* cited by examiner

TIMING SYNCHRONIZATION DEVICE AND TIMING SYNCHRONIZATION CONTROL METHOD

TECHNICAL FIELD

The present invention relates to technology for outputting a signal synchronized with a synchronization signal source which outputs a signal synchronized with, for example, Coordinated Universal Time (UTC).

BACKGROUND ART

In the related art, technology in which a Global Navigation Satellite System (GNSS) receiver receives a signal broadcast from a GNSS satellite and outputs a timing signal synchronized with UTC has been proposed (for example, see Patent Document 1).

DOCUMENT OF THE PRIOR ART

Patent Document

[Patent Document 1]
Japanese Unexamined Patent Application, First Publication No. 2010-273148

DISCLOSURE OF INVENTION

Problems to be Solved by the Invention

However, it may be difficult to precisely receive a signal broadcast from a GNSS satellite due to the effect of interruption of a signal, an interference signal, or the like. In this case, synchronization precision of a timing signal is degraded. As a resolution for maintaining the precision, a method of providing a highly precise oscillator has also been proposed. However, when the highly precise oscillator is provided, there is a problem in that a device size or cost is increased.

This problem is not limited to synchronization using a GNSS, and also similarly occurs in a system which provides a synchronization signal using communication via a network. In this system, when a failure has occurred in the network, the precision of the synchronization signal is degraded and a similar problem occurs.

Means for Solving the Problem

In view of the above-described circumstances, an object of the present invention is to provide technology for preventing the synchronization precision of an output timing signal from being degraded even when synchronization precision according to a synchronization signal has been degraded.

In an embodiment of the present invention, there is provided a synchronization device including: a first signal acquisition unit which acquires a first synchronization signal for synchronization with a synchronization signal source from a first signal source and generates a first signal synchronized with the synchronization signal source based on the first synchronization signal; a second signal acquisition unit which acquires a second synchronization signal for synchronization with the synchronization signal source from a second signal source different from the first signal source and generates a second signal synchronized with the synchronization signal source based on the second synchronization signal; a timing signal generation unit which generates a timing signal synchronized with the synchronization signal source based on the first signal; a comparison unit which outputs a phase difference between the timing signal and the second signal; and a control unit which sets an offset for the timing signal generation unit so that there is no phase difference between the timing signal and the second signal based on the phase difference.

In another embodiment of the present invention, there is provided a synchronization method including: a first signal acquisition step of acquiring a first synchronization signal for synchronization with a synchronization signal source from a first signal source and generating a first signal synchronized with the synchronization signal source based on the first synchronization signal; a second signal acquisition step of acquiring a second synchronization signal for synchronization with the synchronization signal source from a second signal source different from the first signal source and generating a second signal synchronized with the synchronization signal source based on the second synchronization signal; a timing signal generation step of generating a timing signal synchronized with the synchronization signal source based on the first signal synchronized with the synchronization signal source; a comparison step of outputting a phase difference between the timing signal and the second signal; and a control step of setting an offset in the timing signal generation step so that there is no phase difference between the timing signal and the second signal based on the phase difference.

Effect of the Invention

According to the present invention, the synchronization device can output a timing signal based on an offset set before then and a first synchronization signal even when synchronization precision according to a synchronization signal (second synchronization signal) has been degraded. Because of this, it is possible to prevent synchronization precision of a timing signal from being degraded even when synchronization precision according to the synchronization signal has been degraded.

EMBODIMENTS FOR CARRYING OUT THE INVENTION

First Embodiment

Figure 1:
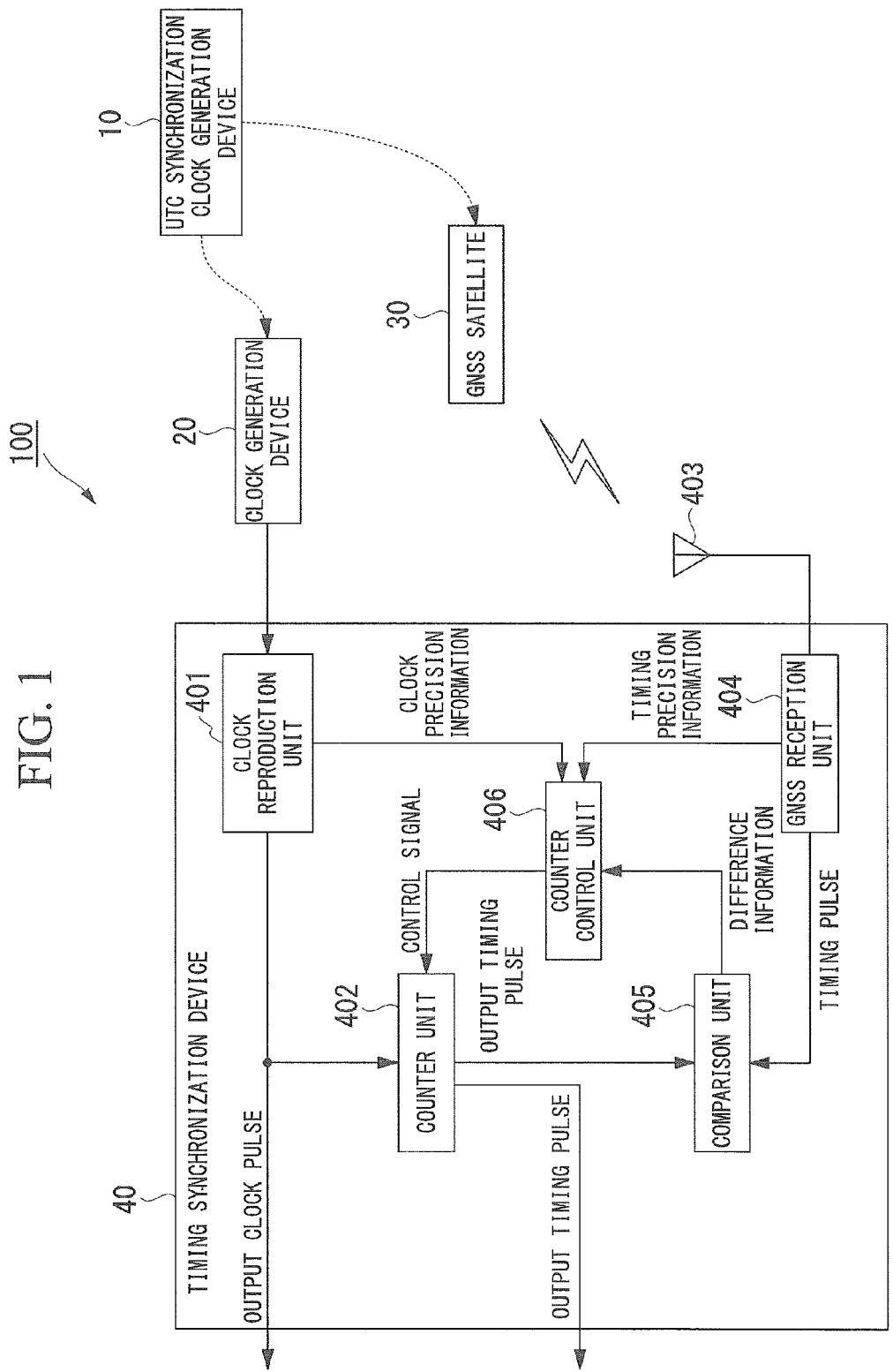
FIG. 1 is a system configuration diagram illustrating a system configuration of a synchronization system in a first embodiment.

FIG. 1 is a system configuration diagram illustrating a system configuration of a synchronization system (synchronization system 100) in a first embodiment of the present invention. The synchronization system 100 includes a UTC synchronization clock generation device 10, a clock generation device 20, a GNSS satellite 30, and a timing synchronization device 40.

The UTC synchronization clock generation device 10 generates a clock pulse synchronized with UTC. The UTC synchronization clock generation device 10 delivers the generated clock pulse to the clock generation device 20 and the GNSS satellite 30 in a state of synchronization with UTC.

The clock generation device 20 generates a clock pulse synchronized with UTC and transmits the generated clock pulse to the timing synchronization device 40.

The GNSS satellite 30 transmits a GNSS broadcast signal including a clock pulse synchronized with UTC with high precision.

The timing synchronization device 40 outputs a signal (output timing pulse) synchronized with UTC based on the clock pulse transmitted from the clock generation device 20 and the GNSS broadcast signal transmitted from the GNSS satellite 30. Hereinafter, the timing synchronization device 40 will be described in further detail.

The timing synchronization device 40 includes a clock reproduction unit 401, a counter unit 402, an antenna 403, a GNSS reception unit 404, a comparison unit 405, and a counter control unit 406.

The clock reproduction unit 401 receives a clock pulse transmitted from the clock generation device 20 and outputs an output clock pulse synchronized with the clock pulse. An output destination of the output clock pulse is an outside of the timing synchronization device 40 and the counter unit 402. The clock reproduction unit 401, for example, is configured using a phase-locked loop (PLL). Any technology may be used to transmit and receive a clock pulse between the clock generation device 20 and the clock reproduction unit 401. For example, a clock pulse may be transmitted and received as a clock to be used in International Telecommunication Union Telecommunication Standardization Sector (ITU-T) G8261 (Synchronous Ethernet (registered trademark)) or ITU-T Synchronous Optical NETwork/Synchronous Digital Hierarchy (SONET/SDH). In the case of this example, the clock pulse is transmitted and received as a signal of a physical layer (layer 1) through a transmission path between the clock generation device 20 and the clock reproduction unit 401. In addition, the present invention is not limited to the above-described protocol, and a clock pulse may be transmitted and received as a signal which flows through the transmission path.

In addition, the clock reproduction unit 401 generates clock precision information representing synchronization precision of an output clock pulse. The clock precision information may be information representing whether an input signal (received clock pulse) is synchronized with an output signal (output clock pulse) (more specifically, information representing a phase difference between an input signal and an output signal), for example, in a phase synchronization circuit applied to the clock reproduction unit 401. In addition, this may be information representing the magnitude of a phase difference between the input signal and the output signal. The clock reproduction unit 401 outputs the generated clock precision information to the counter control unit 406.

The counter unit 402 counts a signal of an output clock pulse and outputs an output timing pulse when the predetermined number of times has been counted. That is, the counter unit 402 is a prescaler of the output clock pulse.

The antenna 403 receives a GNSS broadcast signal transmitted from the GNSS satellite 30. The antenna 403 converts the received GNSS broadcast signal into an electrical signal, and outputs the GNSS broadcast signal (electrical signal) to the GNSS reception unit 404.

The GNSS reception unit 404 outputs a timing pulse synchronized with a clock of the GNSS satellite 30 to the comparison unit 405 based on the GNSS broadcast signal received by the antenna 403.

In addition, the GNSS reception unit 404 generates timing precision information representing synchronization precision of a timing pulse. The timing precision information, for example, is the number of GNSS satellites from which the antenna 403 receives GNSS broadcast signals, a reception level of each GNSS broadcast signal, precision information included in the GNSS broadcast signal, information (hereinafter referred to as "status information") representing the status of the GNSS reception unit 404 and the like. Precision information included in the GNSS broadcast signal is information representing a result after the GNSS satellite, which is a transmission source of the GNSS broadcast signal, has evaluated whether precision of its own output clock pulse is sufficient. The status information is information representing whether the status of the GNSS reception unit 404 is a status in which the precision of the output timing pulse can be sufficiently maintained. The status information, for example, is information representing whether the GNSS reception unit 404 is in a warm-up status or in a status (operating status) in which a timing pulse calculated based on the GNSS broadcast signal is output. The GNSS reception unit 404 outputs the generated timing precision information to the counter control unit 406.

The comparison unit 405 acquires a phase difference between an output timing pulse and a timing pulse. The comparison unit 405 outputs the acquired phase difference as difference information to the counter control unit 406.

The counter control unit 406 controls the counter unit 402 based on the clock control information, the timing precision information, and the difference information.

Figure 2:
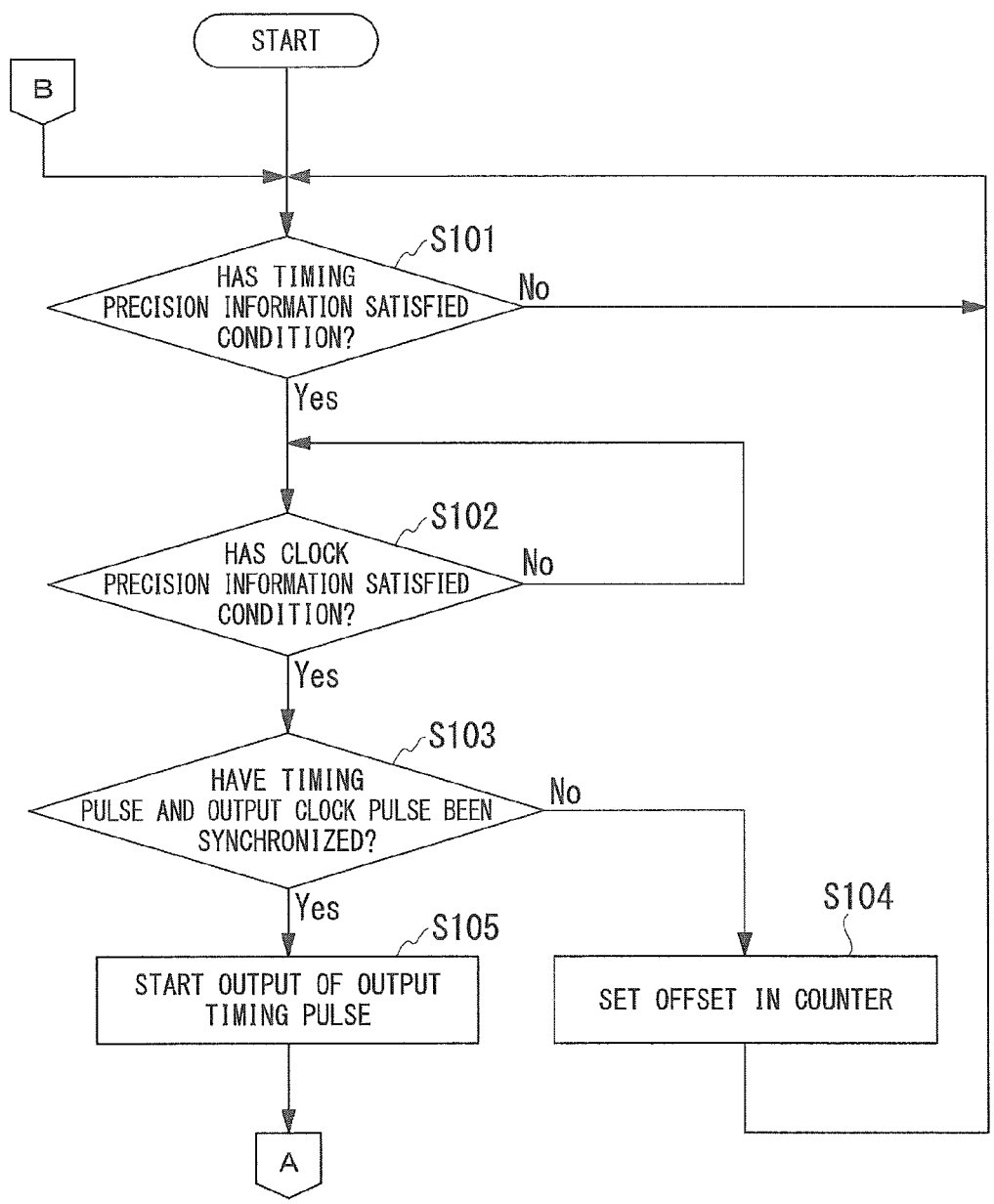
FIG. 2 is a flowchart illustrating a flow of a process in an initial operation of the synchronization system in the first embodiment.

FIG. 2 is a flowchart illustrating a flow of a process in an initial operation among operations of the counter control unit 406. At a point in time at which the initial operation has been started, the counter unit 402 does not output an output timing pulse outside the timing synchronization device 40.

When an operation of the timing synchronization device 40 is started, the counter control unit 406 determiners whether timing precision information has satisfied a predetermined condition (step S101). The predetermined condition is a condition representing that the precision of synchronization of a timing pulse output by the GNSS reception unit 404 is sufficient. For example, a condition that the number of GNSS satellites from which GNSS broadcast signals are received be greater than or equal to a predetermined number, that a reception level of each GNSS broadcast signal be greater than or equal to a predetermined threshold value, that precision information included in the GNSS broadcast signal be a predetermined value (a value representing that the precision of a clock pulse is sufficient), or that status information be predetermined content (for example, content representing the above-described operating status) may be preset in the counter control unit 406. A plurality of conditions may be set.

The counter control unit 406 makes an iterative determination until the timing precision information has satisfied the predetermine condition (step S101: NO). When the timing precision information has satisfied the predetermined condition (step S101: YES), the counter control unit 406 determines whether clock precision information has satisfied a predetermined condition (step S102). The predetermined condition is a condition representing that the precision of synchronization of a clock pulse output by the clock reproduction unit 401 is sufficient. For example, a condition that a phase difference between an input signal and an output signal be less than or equal to a predetermined threshold value may be preset in the counter control unit 406. A plurality of conditions may be set.

The counter control unit 406 makes an iterative determination until the clock precision information has satisfied the predetermined condition (step S102: NO). When the clock precision information has satisfied the predetermined condition (step S102: YES), the counter control unit 406 determines whether a timing pulse and an output clock pulse have been synchronized based on the difference information output from the comparison unit 405 (step S103). For example, when a phase difference indicated by the difference information is less than or equal to a predetermined threshold value, the counter control unit 406 determines that the two pulses have been synchronized.

When the timing pulse and the output clock pulse have not been synchronized (step S103: NO), the counter control unit 406 sets the phase difference indicated by the difference information as an offset in the counter unit 402 (step S104). On the other hand, when the timing pulse and the output clock pulse are synchronized (step S103: YES), the counter control unit 406 causes the counter unit 402 to start an output of an output timing pulse outside the timing synchronization device 40 (step S105). In the above, the process of the initial operation illustrated in FIG. 2 ends and the counter control unit 406 starts a normal operation.

Figure 3:
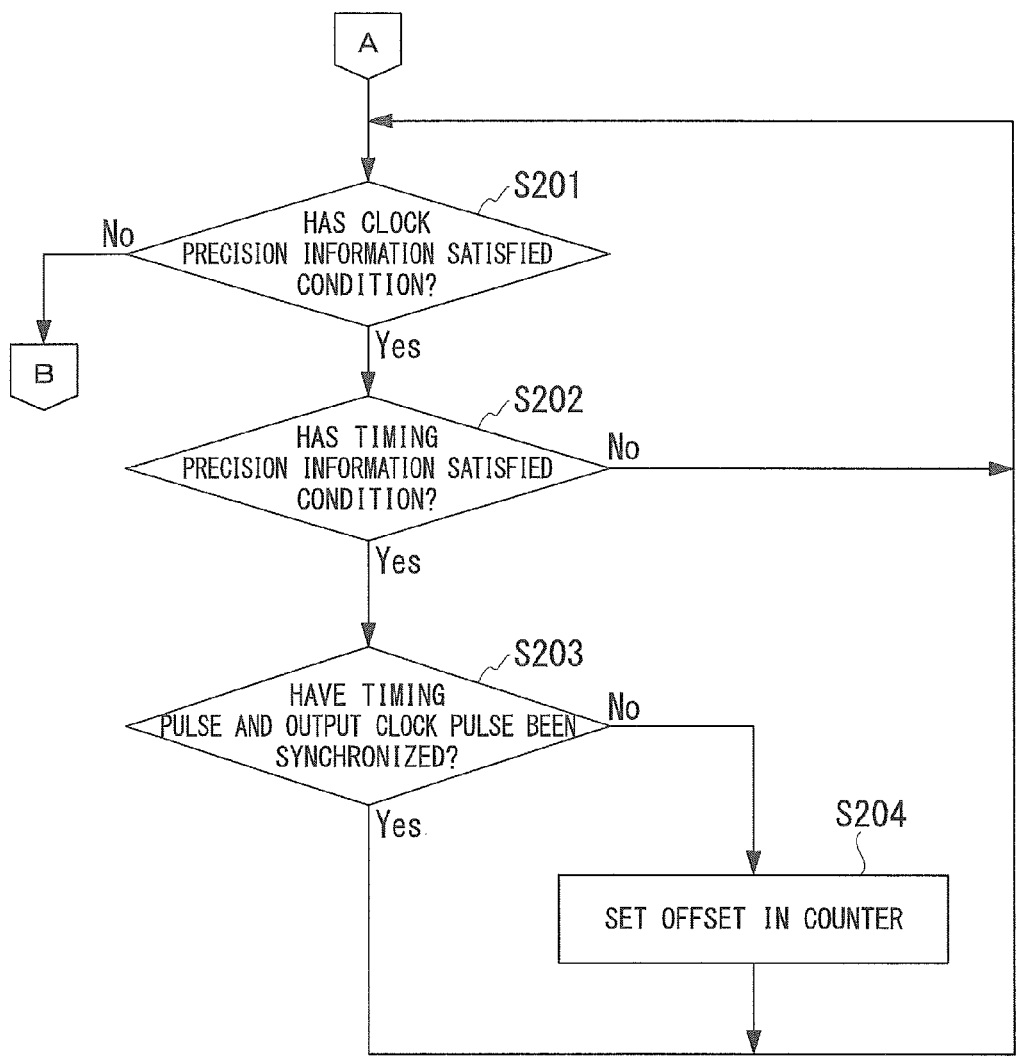
FIG. 3 is a flowchart illustrating a flow of a process in a normal operation of the synchronization system in the first embodiment.

FIG. 3 is a flowchart illustrating a flow of a process in the normal operation among operations of the counter control unit 406. When the normal operation is started, the counter control unit 406 determines whether the clock precision information has satisfied a predetermined condition (step S201). When the predetermined condition has not been satisfied (step S201: NO), the counter control unit 406 ends the normal operation and performs a process from step S101 by returning to an initial operation. At this time, the counter control unit 406 causes the counter unit 402 to stop an output of the output timing pulse outside the timing synchronization device 40.

On the other hand, when the clock precision information has satisfied the predetermined condition (step S201: YES), the counter control unit 406 determines whether timing precision information has satisfied a predetermined condition (step S202). When the timing precision information has not satisfied the predetermined condition (step S202: NO), the counter control unit 406 performs a process by returning to step S201. On the other hand, when the timing precision information has satisfied the predetermined condition (step S202: YES), the counter control unit 406 determines whether the timing pulse and the output clock pulse have been synchronized (step S203).

When the timing pulse and the output clock pulse have not been synchronized (step S203: NO), the counter control unit 406 sets a phase difference indicated by the difference information as an offset in the counter unit 402 (step S204).

On the other hand, when the timing pulse and the output clock pulse have been synchronized (step S203: YES), the counter control unit 406 iteratively executes a process from S201 by returning to the process of step S201.

In the synchronization system 100 configured as described above, even when synchronization precision according to a synchronization signal (GNSS broadcast signal) has been degraded, it is possible to suppress the degradation of synchronization precision of an output timing signal (output timing pulse). Hereinafter, this effect will be described in detail.

The clock reproduction unit 401 generates the output clock pulse based on the clock pulse received from the clock generation device 20. Based on the output clock pulse, the counter unit 402 generates and outputs the output timing pulse. The offset is set by the counter control unit 406, so that synchronization precision of the output timing pulse output by the counter unit 402 has the same degree as synchronization precision based on a GNSS broadcast signal received by the GNSS reception unit 404. That is, synchronization precision of the output timing pulse generated based on the clock pulse received from the clock generation device 20 can have the same degree as synchronization precision based on the GNSS broadcast signal. Accordingly, even when it is difficult to precisely receive the GNSS broadcast signal according to the effect of interruption, an interference signal, or the like, it is possible to precisely output the output timing pulse based on an offset set at a point in time at which the GNSS broadcast signal has been precisely received. Because of this, it is not necessary to include a highly precise oscillator with long-term stability in the timing synchronization device 40 in order to maintain synchronization precision of the output timing pulse.

Modified Example

The clock generation device 20 may transmit a message indicating synchronization precision of its own output clock pulse as a protocol data unit (PDU) to the timing synchronization device 40. In this case, the clock reproduction unit 401 may generate and output clock precision information based on the received message.

Figure 4:
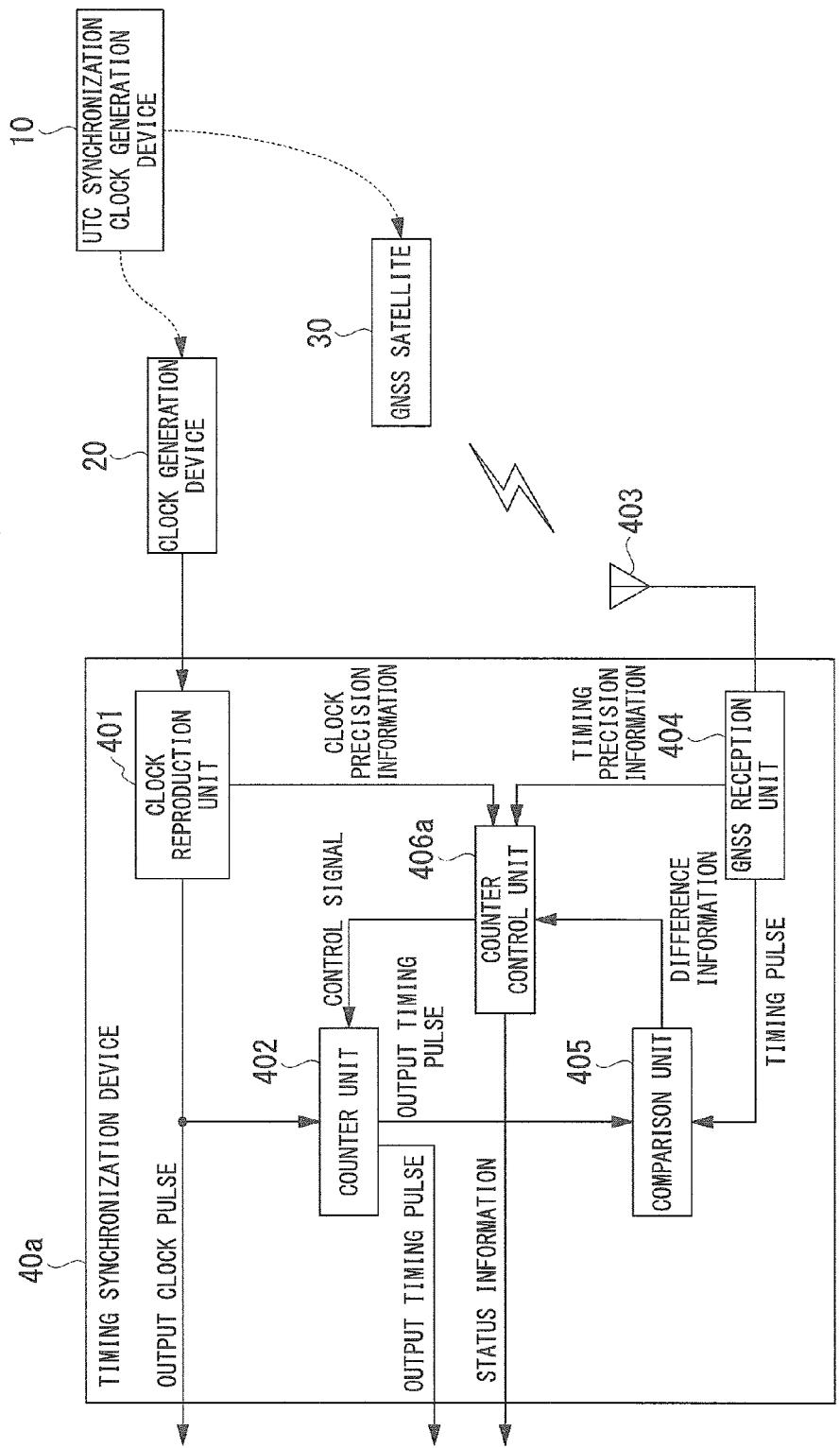
FIG. 4 is a diagram illustrating a configuration of a modified example of a timing synchronization device of the synchronization system in the first embodiment.

The counter control unit 406 may control the counter unit 402 so that the output timing pulse is output outside the timing synchronization device 40 even while the initial operation is executed. However, synchronization precision of an output timing pulse to be output while the initial operation is executed is likely to be low. Because of this, the counter control unit 406 may be configured to output status information indicating whether the initial operation is in execution or whether the normal operation is in execution outside the timing synchronization device 40. An example of the configuration as described above is illustrated in FIG. 4. That is, FIG. 4 is a diagram illustrating a configuration of a modified example (timing synchronization device 40*a*) of a first embodiment of the timing synchronization device. The timing synchronization device 40*a* is different from the timing synchronization device 40 in that a counter control unit 406*a* is provided in place of the counter control unit 406.

The counter control unit 406*a* controls the counter unit 402 so that the output timing pulse is constantly output outside the timing synchronization device 40*a*. In addition, the counter control unit 406*a* outputs status information outside the timing synchronization device 40*a*.

In the timing synchronization device 40*a* configured as described above, the status information is output outside the timing synchronization device 40*a*. Because of this, an external device can recognize whether the output timing pulse output from the timing synchronization device 40*a* is output in the middle of the initial operation or output in the middle of the normal operation. Accordingly, the external device can recognize whether the synchronization precision of the output timing pulse output from the timing synchronization device 40*a* is high.

Second Embodiment

Figure 5:
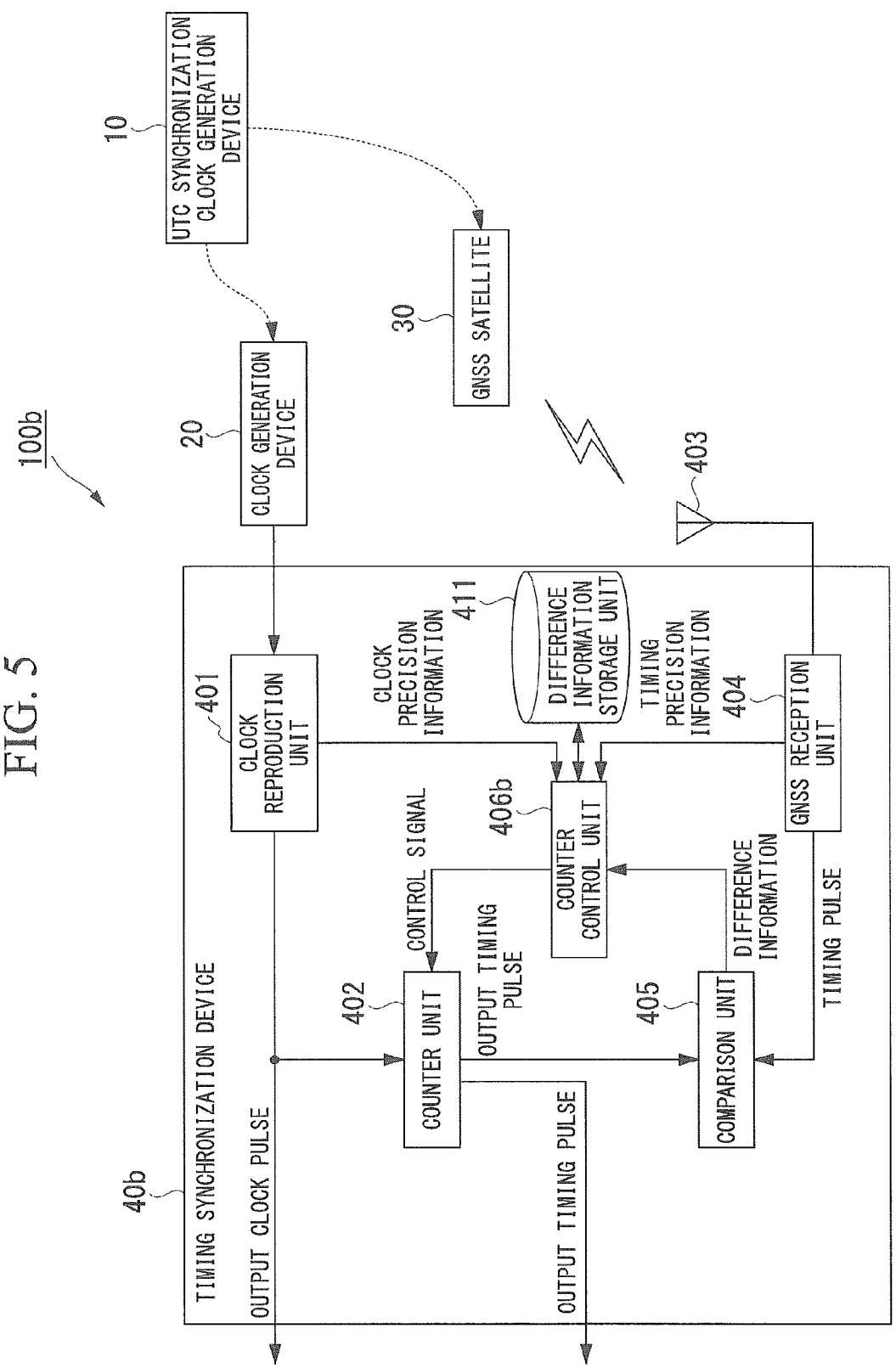
FIG. 5 is a system configuration diagram illustrating a system configuration of a synchronization system in a second embodiment.

FIG. 5 is a system configuration diagram illustrating a system configuration of a synchronization system (synchronization system 100*b*) according to the second embodiment of the present invention. The synchronization system 100*b* is different from the synchronization system 100 in that a timing synchronization device 40*b* is provided in place of the timing synchronization device 40.

The timing synchronization device 40*b* is different from the timing synchronization device 40 in that a difference information storage unit 411 is further included and a counter control unit 406*b* is provided in place of the counter control unit 406. Hereinafter, differences of the timing synchronization device 40*b* from the timing synchronization device 40 will mainly be described.

The difference information storage unit 411 is configured using a storage device such as a magnetic hard disk device or a semiconductor storage device. The difference information storage unit 411 stores one or more pieces of difference information.

The counter control unit 406*b* records the difference information output from the comparison unit 405 on the difference information storage unit 411. Then, the counter control unit 406*b* sets the offset of the counter unit 402 based on the difference information recorded on the difference information storage unit 411.

Figure 6:
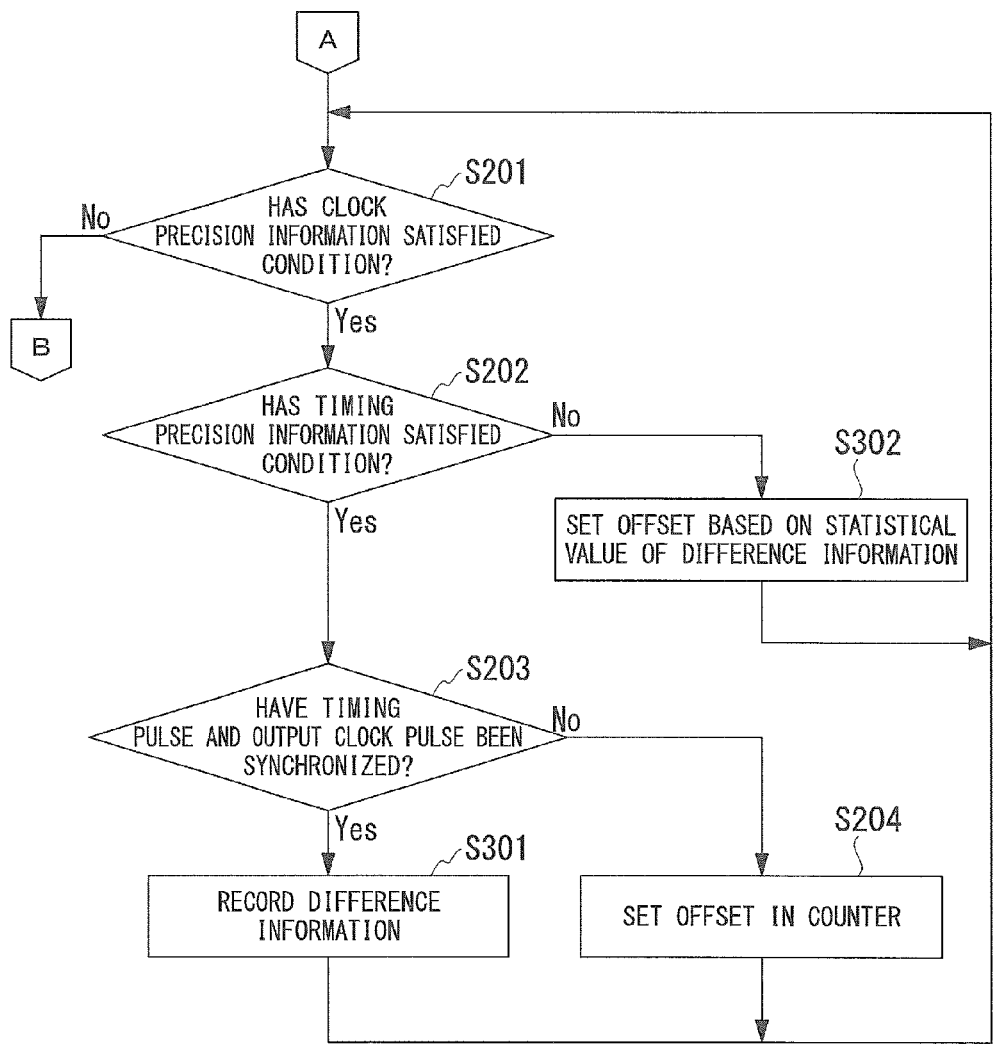
FIG. 6 is a flowchart illustrating an operation example of a counter control unit in the synchronization system in the second embodiment.

FIG. 6 is a flowchart illustrating an operation example of the counter control unit 406*b* in the second embodiment (synchronization system 100*b*) of the synchronization system. In particular, FIG. 6 illustrates a flow of an operation in the normal operation. Because an operation in the initial operation is substantially the same as in the first embodiment (synchronization system 100), description thereof is omitted.

When the normal operation is started, the counter control unit 406*b* determines whether clock precision information has satisfied a predetermined condition (step S201). When the predetermined condition has not been satisfied (step S201: NO), the counter control unit 406*b* ends the normal operation and performs a process from step S101 by returning to the initial operation. At this time, the counter control unit 406*b* causes the counter unit 402 to stop an output of the output timing pulse outside the timing synchronization device 40.

On the other hand, when the clock precision information has satisfied a predetermined condition (step S201: YES), the counter control unit 406*b* determines whether the timing precision information has satisfied a predetermined condition (step S202). The case in which the timing precision information has not satisfied the predetermined condition will be described later. When the timing precision information has satisfied the predetermined condition (step S202: YES), the counter control unit 406*b* determines whether the timing pulse and the output clock pulse have been synchronized (step S203).

When the timing pulse and the output clock pulse have not been synchronized (step S203: NO), the counter control unit 406*b* sets a phase difference indicated by the difference information as an offset in the counter unit 402 (step S204). On the other hand, when the timing pulse and the output clock pulse have been synchronized (step S203: YES), the counter control unit 406*b* records the difference information output from the comparison unit 405 on the difference information storage unit 411 (step S301). Thereafter, the counter control unit 406*b* iteratively executes a process from S201 by returning to a process of step S201.

Description will now return to a process of step S202. When the timing precision information has not satisfied the predetermined condition in the process of step S202 (step S202: NO), the counter control unit 406*b* calculates a statistical value based on the difference information accumulated in the difference information storage unit 411 up to that point in time. For example, assuming that the timing precision information has satisfied the predetermined condition by performing a statistical process based on the accumulated difference information, the counter control unit 406*b* estimates the difference information at a point in time at which the counter unit 402 outputs the next output timing pulse. Then, the counter control unit 406*b* sets the offset in the counter unit 402 based on a statistical value representing an estimation result (step S302).

In the synchronization system 100*b* configured as describe above, the effect similar to that of the first embodiment (synchronization system 100) is obtained. Further, when it is difficult to precisely receive a GNSS broadcast signal due to the effect of interruption, an interference signal, or the like, an offset calculated based on the statistical value of the difference information is newly set in the counter unit 402. Because of this, it is possible to maintain higher synchronization precision of an output timing pulse to be output when such a failure occurs.

Modified Example

A statistical value calculated by the counter control unit 406*b* in the process of step S302 (FIG. 6) need not be limited to the above description. For example, the counter control unit 406*b* may calculate an average value of a plurality of pieces of difference information recorded in a predetermined period as a statistical value. Then, the counter control unit 406*b* may set the average value as the offset in the counter unit 402.

Similarly, the counter control unit 406*b* may calculate a maximum value, a minimum value, a mode value, a center, etc. of the plurality of pieces of difference information recorded in the predetermined period as the statistical value and set calculation results as the offset in the counter unit 402.

The second embodiment may be configured to be modified as in the first embodiment.

Third Embodiment

Figure 7:
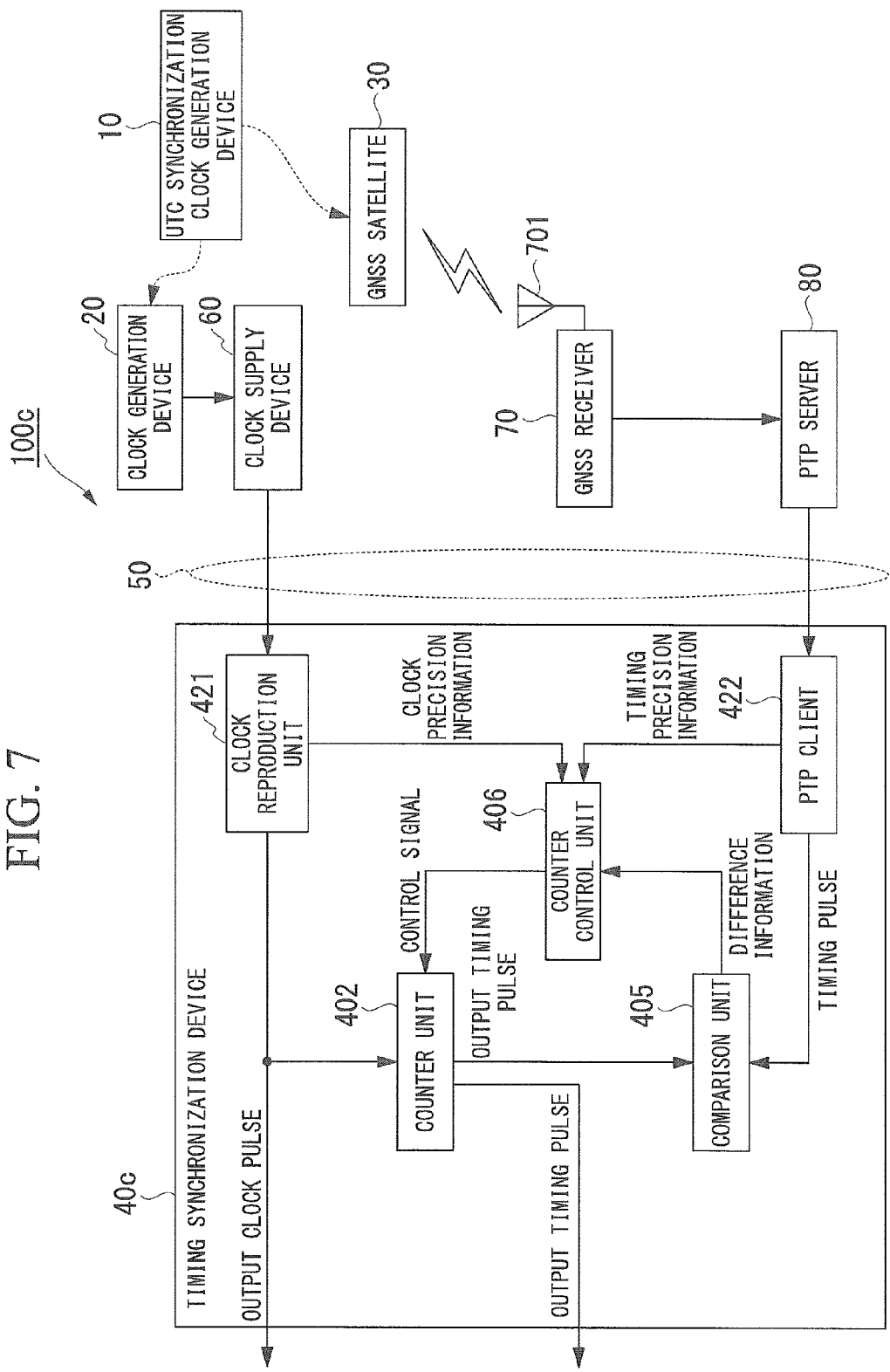
FIG. 7 is a system configuration diagram illustrating a system configuration of a synchronization system in a third embodiment.

FIG. 7 is a system configuration diagram illustrating a system configuration of a synchronization system (synchronization system 100*c*) according to the third embodiment of the present invention. The synchronization system 100*c* is different from the synchronization system 100 in that a network 50, a clock supply device 60, a GNSS receiver 70, and a Precision Time Protocol (PTP) server 80 are further included and the timing synchronization device 40*c* is included in place of the timing synchronization device 40.

The network 50 is a communication path to be communicably connected to the clock supply device 60 and the timing synchronization device 40c. In addition, the network 50 is communicably connected to the PTP server 80 and the timing synchronization device 40c.

The clock supply device 60 transmits a clock pulse output by the clock generation device 20 as the clock pulse in a physical layer of a transmission path of Synchronous Ethernet (registered trademark) to the timing synchronization device 40c via the network 50.

The GNSS receiver 70 outputs a timing pulse synchronized with the clock of the GNSS satellite 30 based on a GNSS broadcast signal received by the antenna 701 to the PTP server 80.

The PTP server 80 is a device that operates according to Precision Time Protocol (PTP: IEEE 1588-2008). The PTP server 80 operates as PTPServer synchronized with a timing pulse output from the GNSS receiver 70, and transmits a synchronization message to PTPClient.

The timing synchronization device 40c is different from the timing synchronization device 40 in that the clock reproduction unit 421 is included in place of the clock reproduction unit 401 and the PTP client 422 is included in place of the GNSS reception unit 404. Hereinafter, differences of the timing synchronization device 40c from the timing synchronization device 40 will mainly be described.

The clock reproduction unit 421 is one specific example of the clock reproduction unit 401. The clock reproduction unit 421 receives a clock pulse in the physical layer of the transmission path of Synchronous Ethernet (registered trademark). The clock reproduction unit 421 outputs an output clock pulse based on the received clock pulse.

The PTP client 422 operates as a PTPClient according to PIP. The PTP client 422 receives a synchronization message transmitted from the PTP server 80 (PTPServer) via the network 50. The PTP client 422 generates and outputs a timing pulse based on the received synchronization message. In addition, the PTP client 422 generates the timing precision information based on a reception interval (time) of the synchronization message received from the PTP server, information representing synchronization precision included in the synchronization message, or the like.

In the synchronization system 100c configured as described above, an effect similar to that of the first embodiment (synchronization system 100) is obtained. Further, in the synchronization system 100c, it is possible to install the timing synchronization device 40c in any place if a connection to the network 50 is also possible. Therefore, even in an environment in which it is difficult to receive a GNSS broadcast signal differently from the timing synchronization device 40 of the first embodiment, it is possible to install the timing synchronization device 40c. Because of this, a range in which the timing synchronization device 40c can be installed is widened. For a similar reason, it is possible to reduce building cost of the timing synchronization device 40c.

In addition, in synchronization using PTP, it is necessary to transmit and receive a synchronization message. Because of this, it is difficult to maintain the precision of synchronization according to PTP in a situation in which a communication situation is unstable (for example, a situation in which an error packet frequently occurs). However, the clock supply device 60 and the clock reproduction unit 421, which transmit and receive a clock pulse in a physical layer of a transmission path such as Synchronous Ethernet (registered trademark), can transmit and receive the clock pulse even in an unstable communication situation as described above and maintain synchronization precision using the offset.

In addition, in synchronization using PTP, synchronization precision is degraded when a transmission/reception interval of the synchronization message is increased. However, in the synchronization system 100c, the synchronization precision of the output timing pulse is maintained based on a clock pulse and an offset received by the clock reproduction unit 421 from the clock supply device 60 as well as the PTP. Because of this, it is possible to maintain synchronization precision while increasing a transmission/reception interval of a synchronization message between the PTP server 80 and the PTP client 422.

Modified Example

The network to which the clock supply device 60 is connected may be different from a network to which the PTP server 80 is connected.

The third embodiment may be configured to be modified as in the first embodiment.

Although the embodiments of the present invention have been described above in detail with reference to the drawings, specific configurations are not limited thereto and designs and the like can also be changed without departing from the scope of the present invention.

INDUSTRIAL APPLICABILITY

A synchronization device of the present invention can prevent synchronization precision of a timing signal to be output from being degraded even when the synchronization precision according to a synchronization signal has been degraded.

Priority is claimed on Japanese Patent Application No. 2011-121461, filed May 31, 2011, the content of which is incorporated herein by reference.

DESCRIPTION OF REFERENCE SYMBOLS

10 UTC synchronization clock generation device (synchronization signal source)
20 Clock generation device (first signal source)
30 GNSS satellite (second signal source)
40 Timing synchronization device (synchronization device)
50 Network
60 Clock supply device (first signal source)
70 GNSS receiver
80 PTP server (second signal source)
100 Synchronization system
401 Clock reproduction unit (first signal acquisition unit)
402 Counter unit (timing pulse generation unit)
403 Antenna
404 GNSS reception unit (second signal acquisition unit)
405 Comparison unit
406 Counter control unit (control unit)
411 Difference information storage unit (phase difference storage unit)

The invention claimed is:

1. A timing synchronization device, comprising:
   a clock reproduction unit configured to receive a clock pulse synchronized with a universal time so as to generate an output clock pulse based on the clock pulse along with clock precision information representing a phase difference between the clock pulse and the output clock pulse;
   a reception unite configured to receive a satellite broadcast signal synchronized with the universal time so as to generate a timing pulse along with timing precision information representing a synchronization precision of the timing pulse;
a counter unit, serving as a prescaler, configured to generate an output timing pulse based on the output clock pulse;
a comparison unit configured to generate difference information representing a phase difference between the timing pulse and the output timing pulse; and
a counter control unit configured to control the counter unit, based on the difference information, the clock precision information, and the timing precision information, by:
(i) checking whether the timing precision information meets a first tolerance which is determined in advance;
(ii) checking whether the clock precision information meets a second tolerance which is determined in advance; and
(iii) checking whether the output clock pulse is synchronized with the timing pulse after the checking (i) and the checking (ii) by determining whether the phase difference of the difference information meets a predetermined threshold,
wherein the counter control unit sets an offset corresponding to the phase difference included in the difference information to the counter unit when the checking (iii) indicates an asynchronous state that the output clock pulse is not synchronized with the timing pulse, and
wherein the counter control unit allows the counter unit to output the output timing pulse outside the timing synchronization device when the checking (iii) indicates a synchronous state that the output timing pulse is synchronized with the timing pulse.

2. The timing synchronization device according to claim 1, further comprising:
a difference information storage unit configured to store the difference information representing a plurality of phase differences sequentially collected as long as the timing pulse is synchronized with the output clock pulse,
wherein the counter control unit sets the offset based on a statistical value among the plurality of phase differences, which are collected by the difference information storage unit, when the timing pulse is not synchronized with the output clock pulse.

3. A timing synchronization control method, comprising:
receiving a clock pulse synchronized with a universal time;
generating an output clock pulse based on the clock pulse along with clock precision information, representing a phase difference between the clock pulse and the output clock pulse;
receiving a satellite broadcast signal synchronized with the universal time so as to generate a timing pulse along with timing precision information representing a synchronization precision of the timing pulse;
generating an output timing pulse based on the output clock pulse by a counting operation;
generating difference information representing a phase difference between the timing pulse and the output timing pulse; and
controlling the counting operation, based on the difference information, the clock precision information, and the timing precision information, by:
(i) checking whether the timing precision information meets a first tolerance which is determined in advance;
(ii) checking whether the clock precision information meets a second tolerance which is determined in advance; and
(iii) checking whether the output clock pulse is synchronized with the timing pulse after the checking (i) and the checking (ii) by determining whether the phase difference of the difference information meets a predetermined threshold;
setting an offset corresponding to the phase difference included in the difference information to the counting operation when the checking (iii) indicates an asynchronous state that the output clock pulse is not synchronized with the timing pulse; and
outputting the output timing pulse to an external device when the checking (iii) indicates a synchronous state that the output timing pulse is synchronized with the timing pulse.

4. The timing synchronization device according to claim 1, wherein the counter control unit outputs the output timing pulse by controlling the counter unit based on the difference information, the clock precision information, and the timing precision information.

5. The timing synchronization device according to claim 1, wherein the timing pulse is based on the satellite broadcast signal that includes a Global Navigation Satellite System (GNSS) broadcasting signal.

6. The timing synchronization device according to claim 1, wherein the output timing pulse is based on the output clock pulse that includes a Coordinated Universal Time (UTC) synchronized clock pulse.

7. The timing synchronization control method according to claim 3, wherein, in the controlling the counting operation, a counter controller outputs the output timing pulse by controlling a counter unit based on the difference information, the clock precision information, and the timing precision information, the counter unit generating the output timing pulse.

8. The timing synchronization control method according to claim 3, wherein the timing pulse is based on the satellite broadcast signal that includes a Global Navigation Satellite System (GNSS) broadcasting signal.

9. The timing synchronization control method according to claim 3, wherein the output clock pulse includes a Coordinated Universal Time (UTC) synchronized clock pulse.

* * * * *